Figure 1:
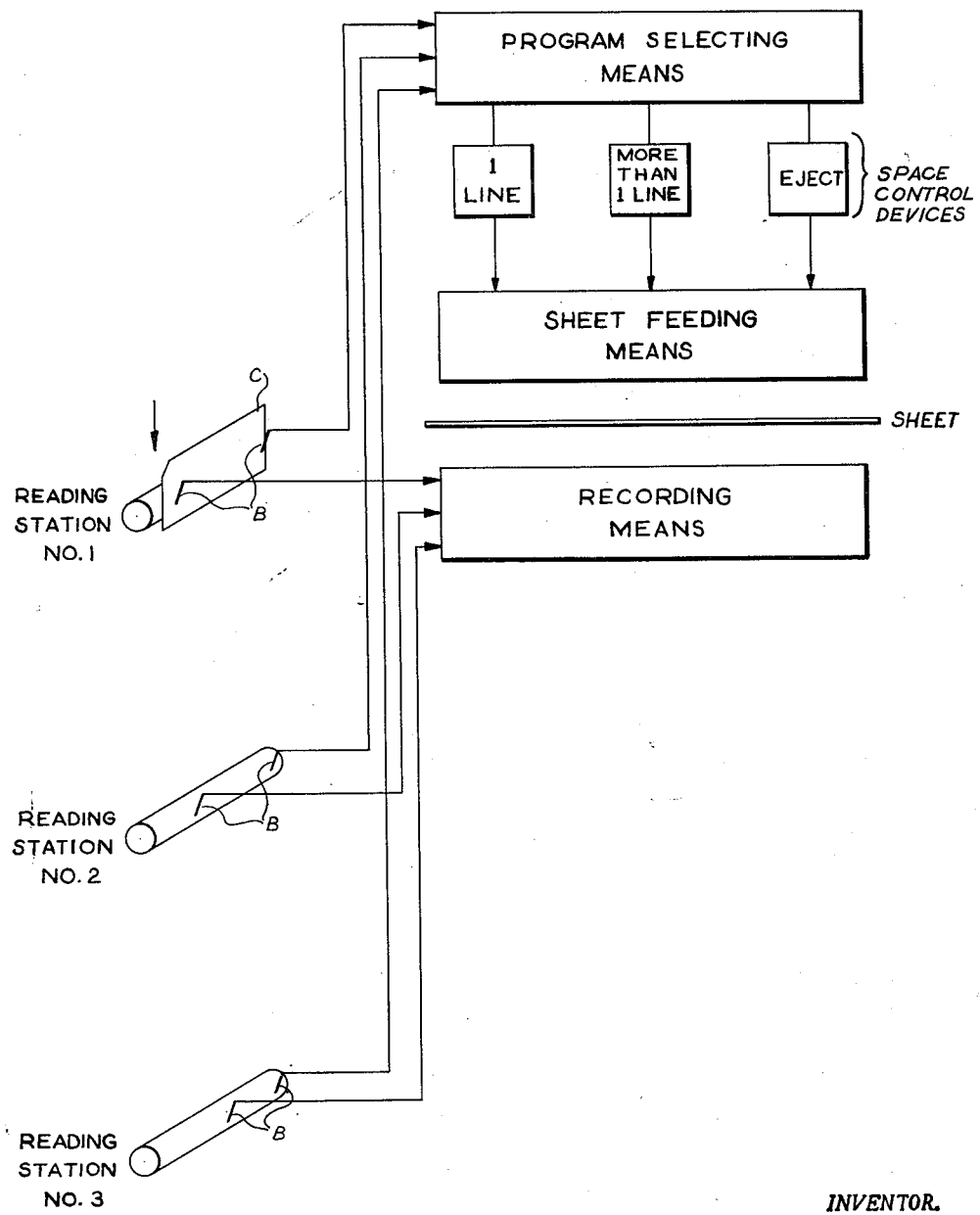

April 30, 1957 A. TEITLER 2,790,528
SHEET FEEDING CONTROL APPARATUS
Filed Jan. 21, 1954 11 Sheets-Sheet 2

INVENTOR.
ALBERT TEITLER
BY
ATTORNEY

April 30, 1957 A. TEITLER 2,790,528
SHEET FEEDING CONTROL APPARATUS
Filed Jan. 21, 1954 11 Sheets-Sheet 4

INVENTOR.
ALBERT TEITLER
BY
Jerome Bauer
ATTORNEY

April 30, 1957 A. TEITLER 2,790,528
SHEET FEEDING CONTROL APPARATUS
Filed Jan. 21, 1954 11 Sheets-Sheet 6
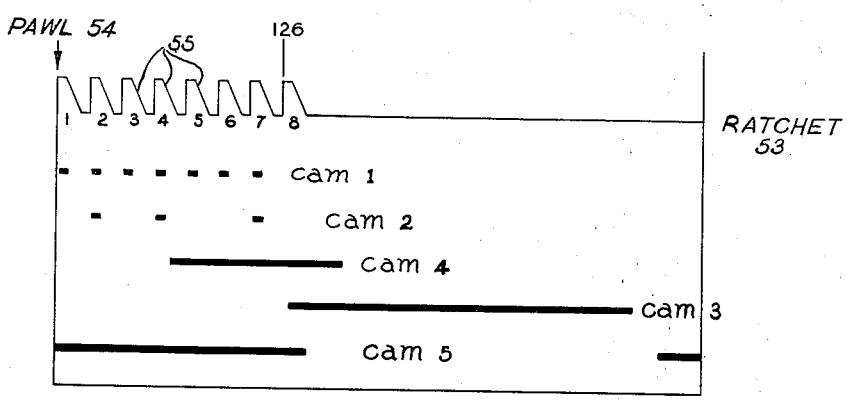
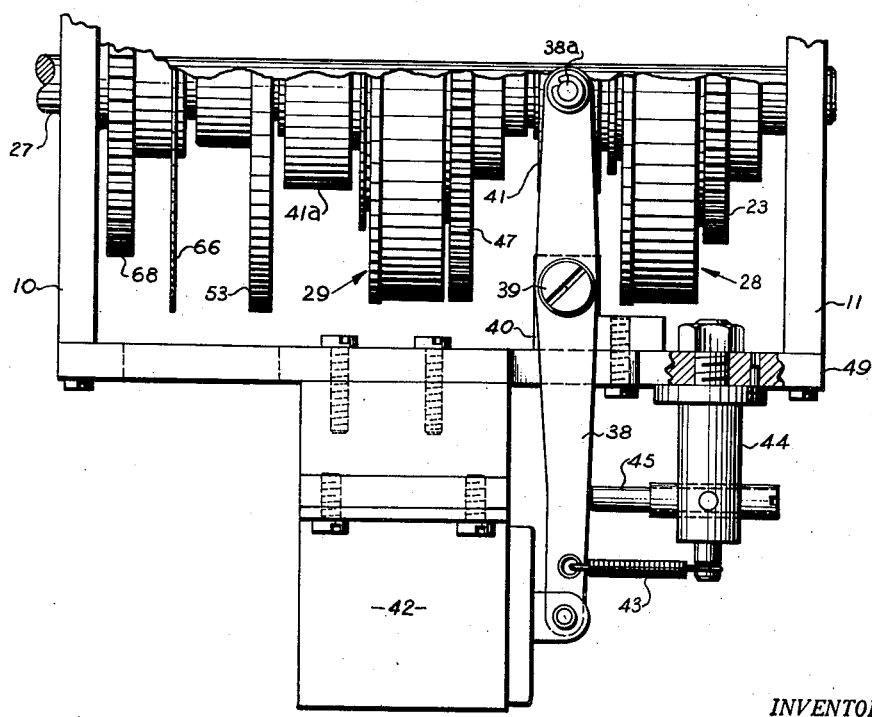
INVENTOR.
ALBERT TEITLER
BY
ATTORNEY April 30, 1957 A. TEITLER 2,790,528
SHEET FEEDING CONTROL APPARATUS
Filed Jan. 21, 1954 11 Sheets-Sheet 7

INVENTOR.
ALBERT TEITLER
BY
ATTORNEY

April 30, 1957 A. TEITLER 2,790,528
SHEET FEEDING CONTROL APPARATUS
Filed Jan. 21, 1954 11 Sheets-Sheet 8
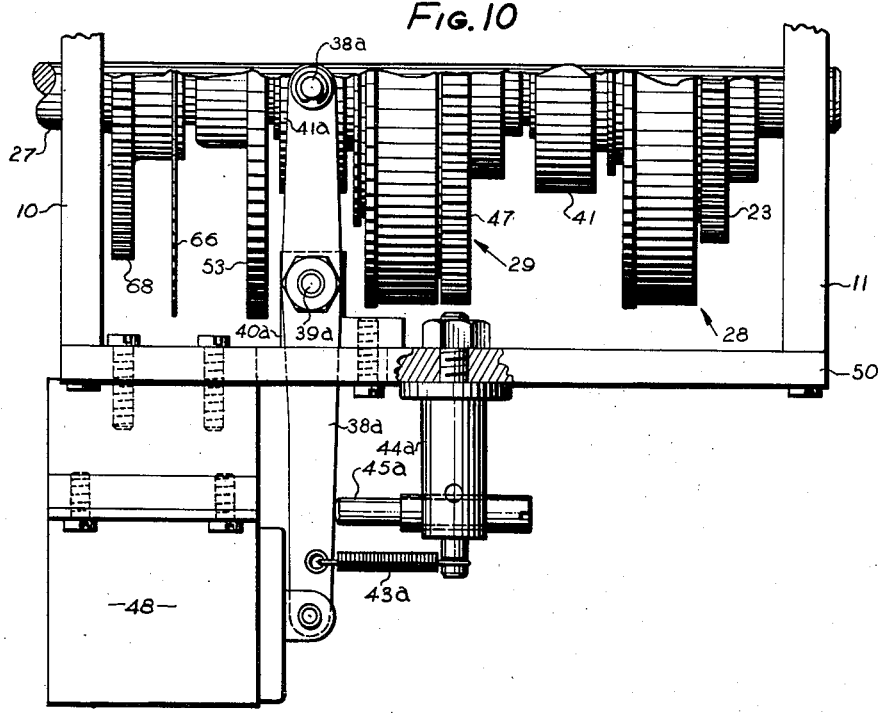
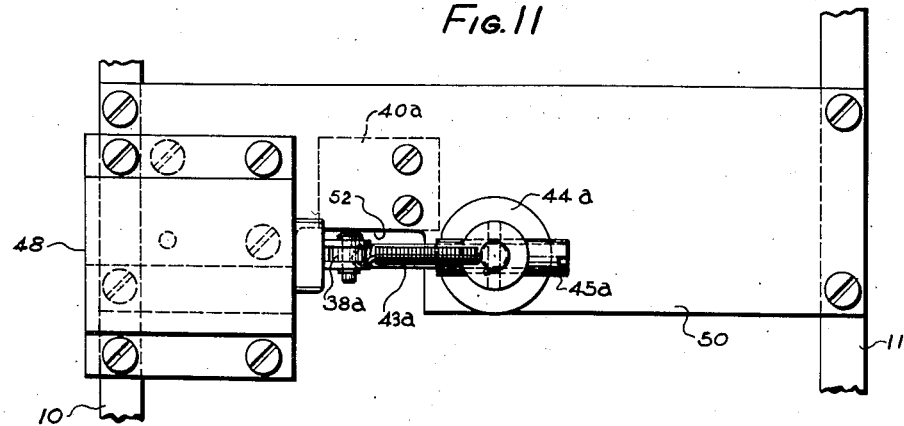
INVENTOR.
ALBERT TEITLER
BY
ATTORNEY April 30, 1957  A. TEITLER  2,790,528
SHEET FEEDING CONTROL APPARATUS
Filed Jan. 21, 1954  11 Sheets-Sheet 9

INVENTOR.
ALBERT TEITLER
BY
ATTORNEY

April 30, 1957 A. TEITLER 2,790,528
SHEET FEEDING CONTROL APPARATUS
Filed Jan. 21, 1954 11 Sheets-Sheet 10
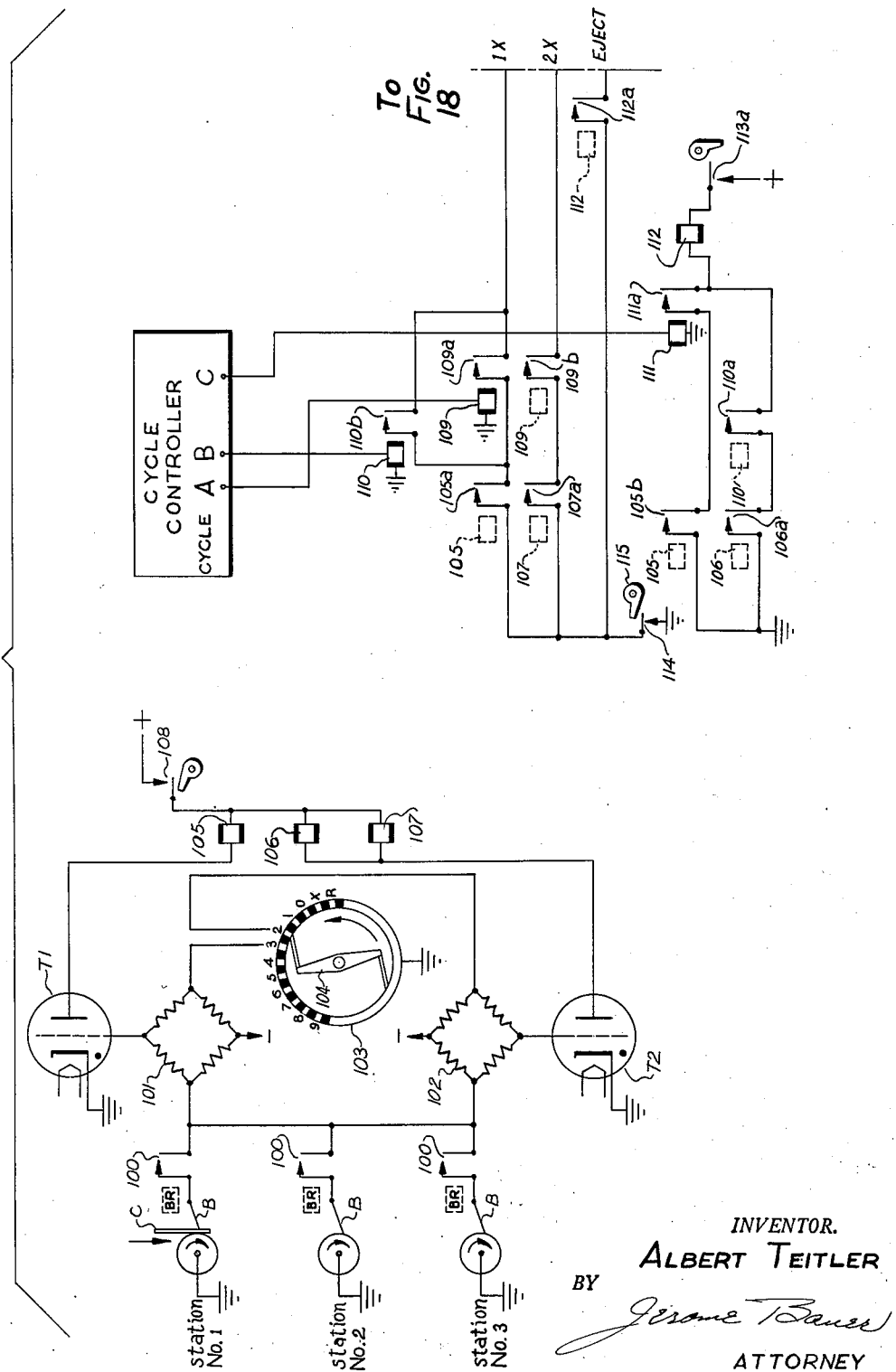
INVENTOR.
ALBERT TEITLER
BY
Jerome Bauer
ATTORNEY

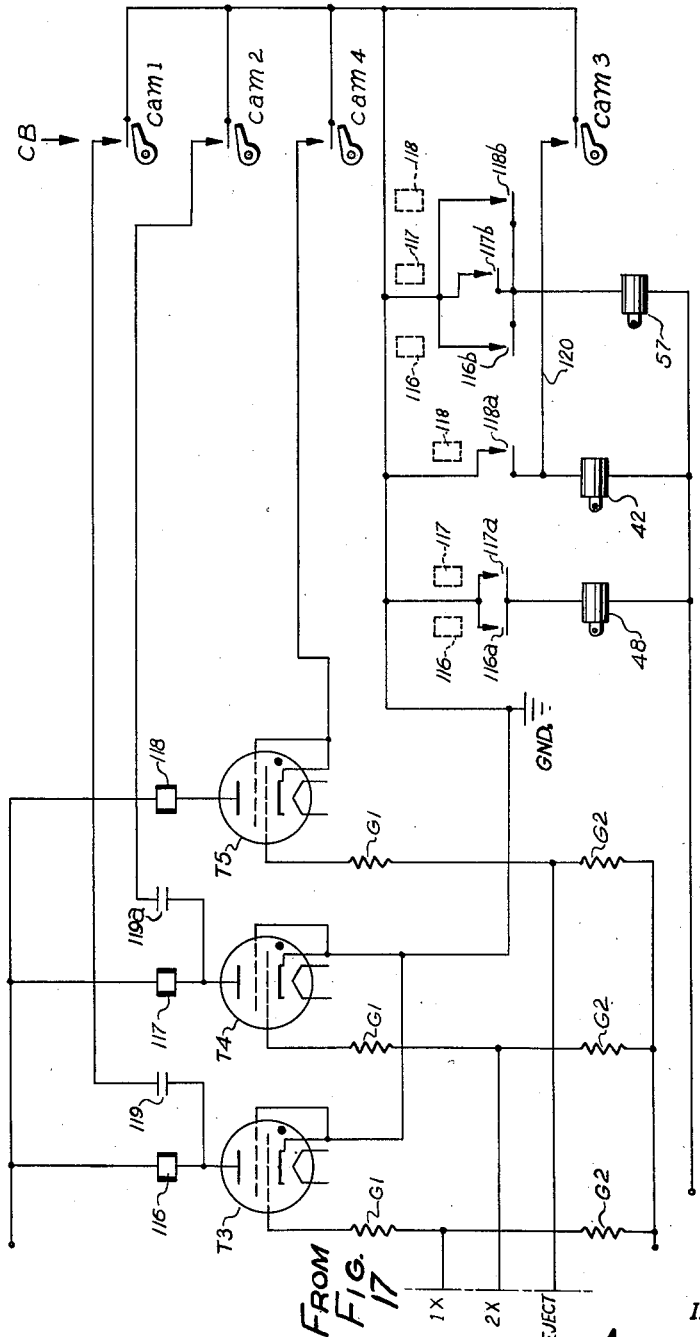

United States Patent Office 2,790,528
Patented Apr. 30, 1957

2,790,528

SHEET FEEDING CONTROL APPARATUS

Albert Teitler, Bronx, N. Y., assignor to Burroughs Corporation, Detroit, Mich., a corporation of Michigan Application January 21, 1954, Serial No. 405,490

5 Claims. (Cl. 197—133)

The present invention relates to recording machines and more particularly to mechanisms for controlling the movements of impression-receiving sheets through such machines.

In its preferred form the invention is adapted for use in the type of recording machines wherein data is taken from a source record and recorded upon an impression-receiving surface such as a sheet, although it is not limited exclusively to such use. Reference may be had to the U. S. Letters Patent to Hyland, No. 2,632,386, and to the U. S. Letters Patent to Wockenfuss, No. 2,648,277, as disclosing examples of recording machines with which the present invention may be used. In these machines the recording is controlled by individual source records, and it is proposed now to use these source records in a novel manner for controlling the movements of the sheet also. Although the term "individual source records" is employed, it is not intended that this be construed necessarily to mean physically disconnected source records. Such individual records may be arranged or contained serially on a single strip as, for example, a tape. However, in such an arrangement the records would still retain their individuality of purpose and function.

One of the principal objects of the invention is to provide a novel control means for automatically controlling the sheet feeding means in response to selective control information contained in the individual source records.

Another object of the invention is the provision of means for automatically feeding the impression-receiving sheet one line at a time, more than one line at a time or to fully eject the sheet, solely in response to selective control information in an individual source record.

Another object of the present invention is the provision of a novel means having greater selectivity and flexibility than prior devices for determining whether said sheet feeding means will be required to feed the sheet one line, more than one line or to eject the same.

Still another object of the invention resides in the feature that the type of feed desired is determined by a programming unit which operates automatically in response to the control information in the individual source records and which requires neither manual presetting nor resetting before each operation.

A further object of the present invention is the provision of improved control devices for controlling the operation of the feed means after the programming unit has determined the type of feed desired.

A feature of the present invention is the provision of improved means which will operate the aforesaid control devices and hold them in operation until terminated by the operation of a timing mechanism.

A further object of the present invention resides in the provision whereby the timing mechanism is set into operation by the operation of the control devices and automatically effects termination of the operation of the control devices and also its own operation after the feeding means has operated for the desired period of time.

Other objects of the invention will be pointed out in the following description and claims and illustrated in the accompanying drawings, which disclose, by way of examples, the principle of the invention and the best mode, which has been contemplated, of applying that principle.

Figure 2:
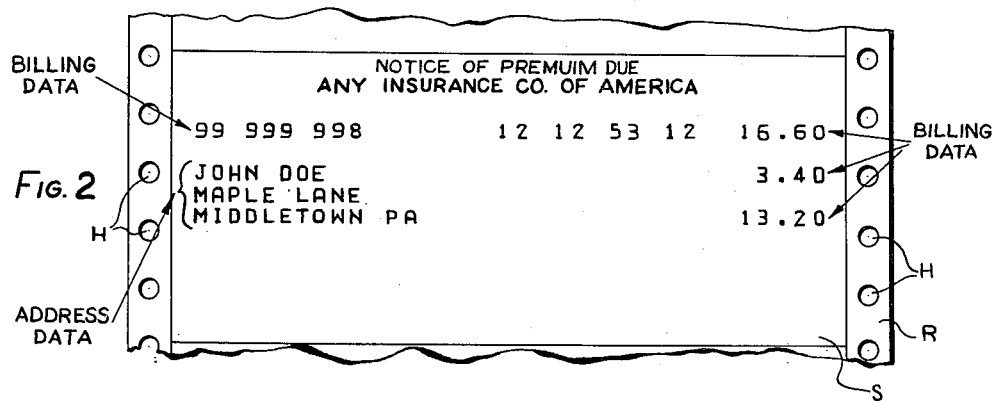
Figure 3:
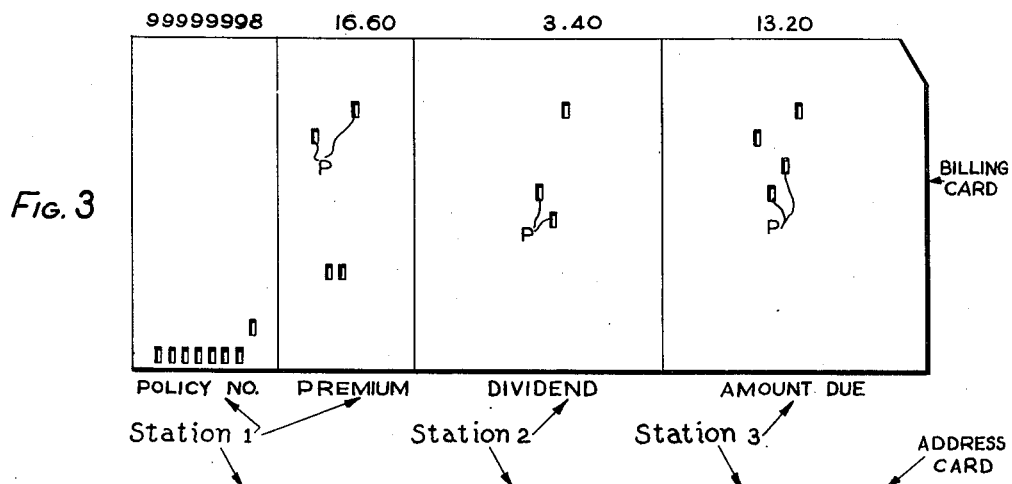
Figure 4:
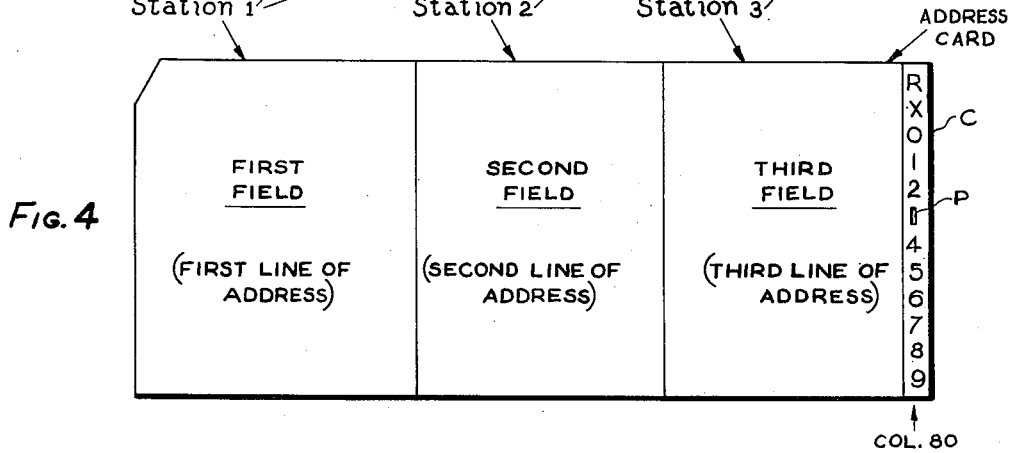
Figure 5:
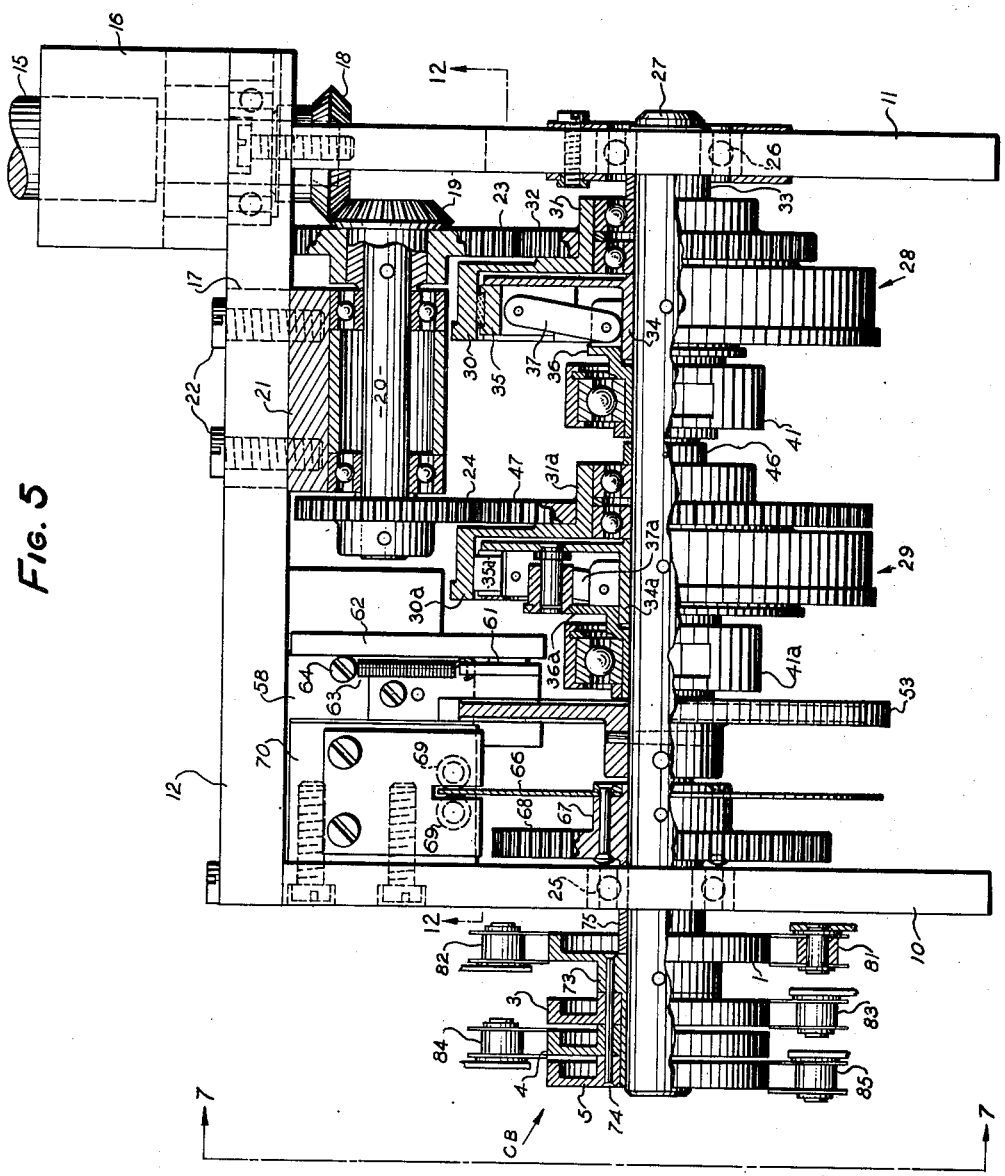
Figure 6:
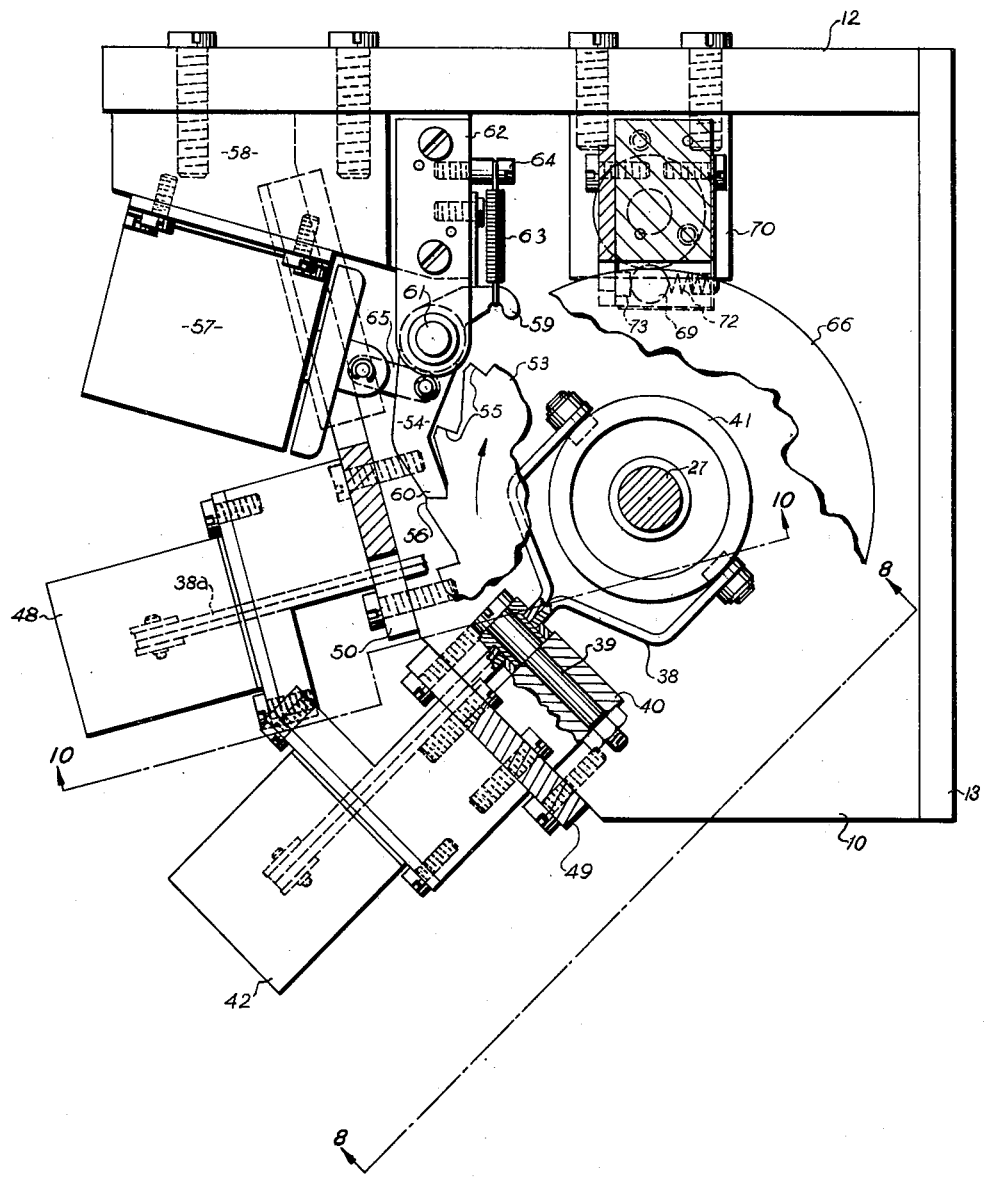
Figure 7:
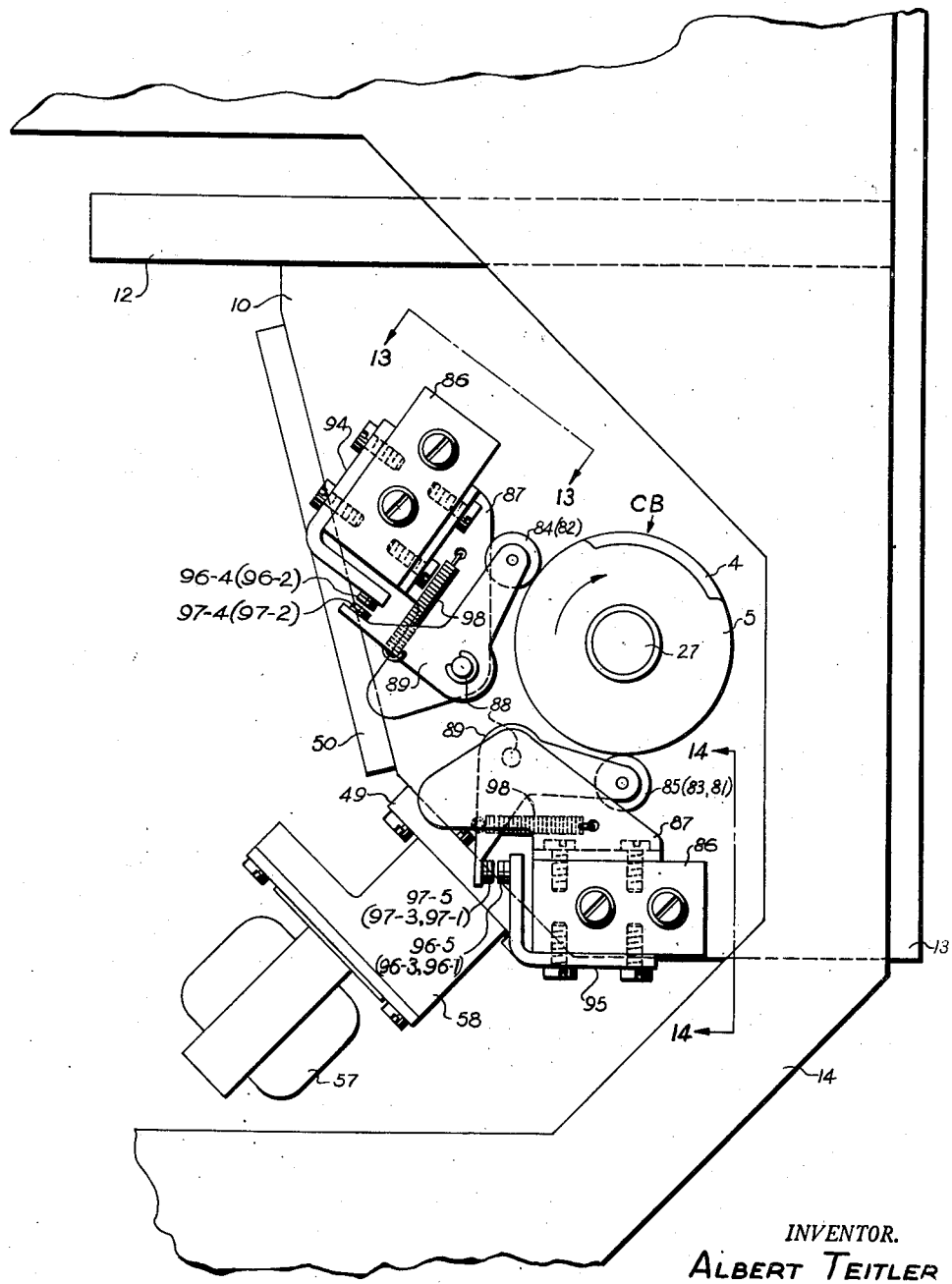
Figure 9:
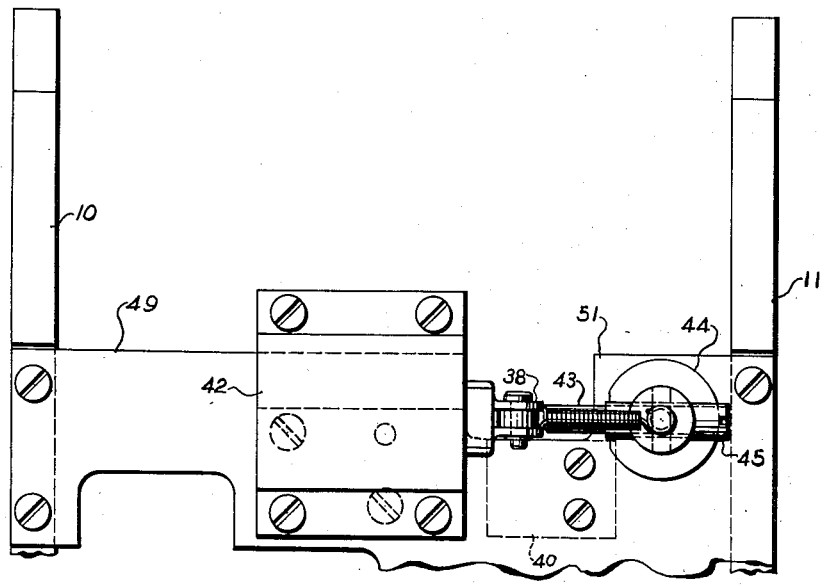
Figure 16:
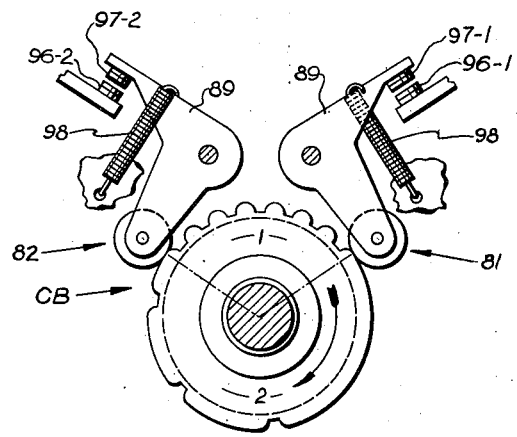
Figure 12:
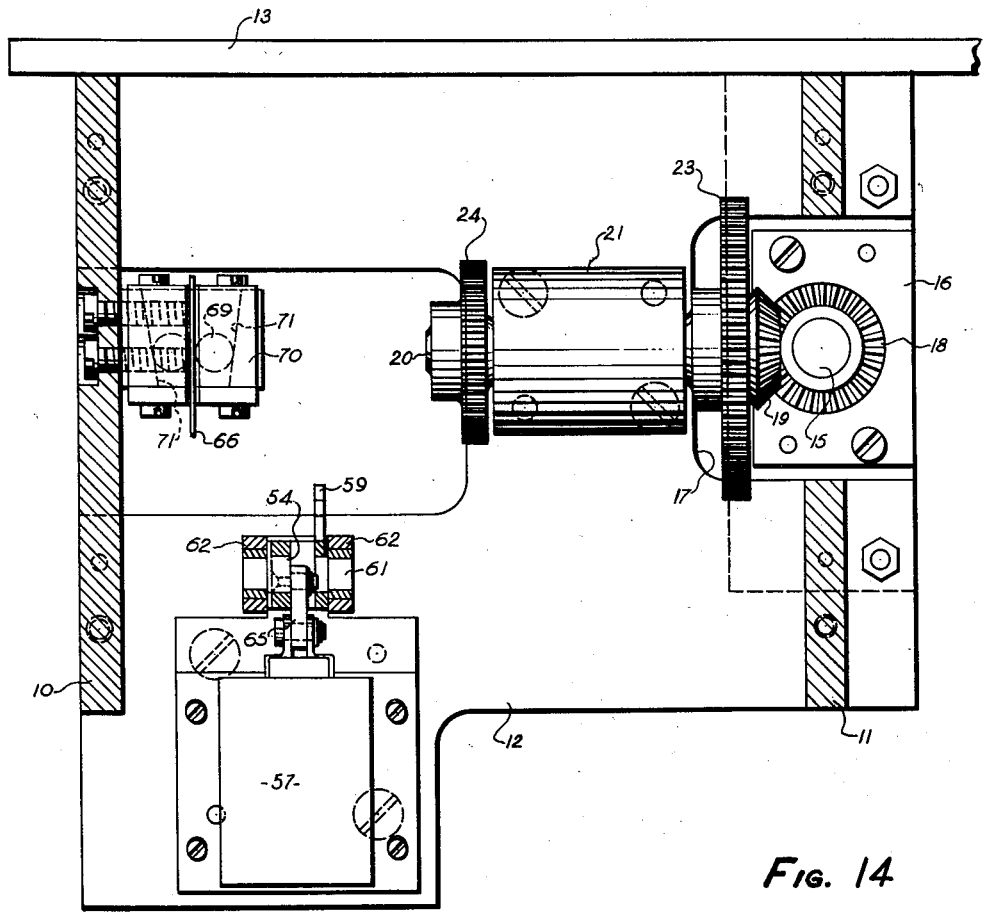
Figure 14:
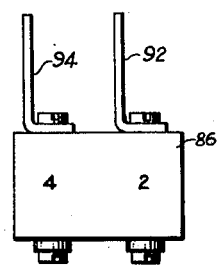
Figure 13:
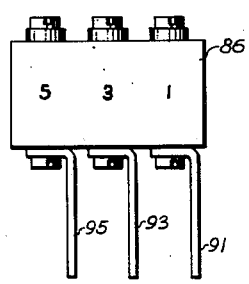

In the drawings:

Fig. 1 is a diagrammatic layout of the elements designed to carry out the principles of my invention, Fig. 2 shows an impression receiving sheet after data has been placed thereon, Fig. 3 shows an individual source record in the form of a punched card with items of billing data or similar information thereon, Fig. 4 shows an individual source record in the form of a punched card with items of address data and control information thereon, Fig. 5 is a plan view of the sheet feeding means, Fig. 6 is a side view of Fig. 5 wherein many of the elements are only fragmentarily shown, Fig. 7 is a side view of Fig. 5 looking in the direction of line 7—7, Fig. 8 is a view taken on line 8—8 of Fig. 6, Fig. 9 is a bottom view of Fig. 8, Fig. 10 is a view taken on line 10—10 of Fig. 6, Fig. 11 is a bottom view of Fig. 10, Fig. 12 is a fragmentary view of Fig. 5 taken substantially along line 12—12, Figs. 13 and 14 are views taken of Fig. 7 along lines 13—13 and 14—14 respectively, Fig. 15 shows a development of the ratchet employed in the sheet feeding means, Fig. 16 shows the specific arrangement of the cam member 1, Fig. 17 is a schematic showing of the sensing and program units, Fig. 18 is a schematic showing of the spacing control circuits.

The invention is illustrated herein as being embodied in a recording machine that operates under the control of individual source records such as the record card C, Figs. 1 and 4. Examples of such recording machines have been mentioned above. The record card C is passed through one or more sensing or reading stations, respectively designated No. 1, No. 2 and No. 3, Fig. 1. During its passage items of data on the record card C will be analyzed and fed to a recording means (Fig. 1) which will record the data on a sheet such as is shown in Fig. 2. Inasmuch as the recording means is of known construction and is not a material part of the present invention, it is not disclosed in detail herein. After each recording operation under control of a record card C, the sheet is required to be moved one line or more than one line at a time, either for the purpose of receiving more data or to be ejected from the machine. The sheet is ejected after all of the intended data has been recorded thereon. The type of sheet feed effected after each of the aforesaid recording operations is determined by the control information which is represented on the record cards C (see Fig. 4), as in Column 80.

It should be mentioned at this point that in addition to operating under the control of the record cards C, Figs. 1 and 4, which hereinafter are referred to as "address cards," the recording means also may operate under the control of additional source records such as the "billing cards" shown in Fig. 3. These billing cards, which may be interspersed with the address cards C, do not control the sheet feeding means in the present embodiment, and their functions in the disclosed apparatus are merely incidental to the purpose of the invention. Hence, the operative interrelation of the recording means and the billing cards will be explained only in general terms herein. This is not meant to infer, however, that the billing cards cannot be adapted to control the sheet feeding means, as such possibility is definitely within the contemplated scope of the invention.

Preferably the sheet feeding control information is placed on each address card C concurrently with the representations of the data to be recorded under control of that card. As the card C passes through the various reading stations, sensing brushes B read and transmit both the items of data and the control information recorded thereon. The control information in Column 80 is transmitted to a program unit having a program selecting means which operates in response to the control information thus received to determine the type of sheet feed required. The determination made by the program unit causes a selected spacing control device to be operated. The sheet feeding means then responds to the operation of the selected spacing control device. Whether the sheet feeding means will move the sheet one line or more than one line at a time, or eject the sheet, depends upon which spacing control device has been selected for operation.

In Fig. 2 there is shown a recorded sheet S in completed form. The sheet S shown constitutes but one part of a long paper strip or web R and is defined by lines of perforations which are represented by full lines in Fig. 2. After the desired recording has been made on the sheet S, the latter can be removed from the paper R by tearing along the perforations. The holes H along the sides of the paper R are adapted to be engaged by sprocket teeth on sprocket wheels (not shown) which are driven by the sheet feeding means.

The items of billing data shown on the sheet S are derived from the data represented on the billing card in Fig. 3. The billing card in Fig. 3 is divided into four sections or fields respectively designated policy number, premium, dividend, and amount due. This division is for illustrative purposes only to show the type of information which may be recorded on the sheet, it being assumed herein that the sheet S will contain a premium notice adapted to be employed by an insurance company. Under the billing card in Fig. 3 there are noted three station designations. These legends indicate which data on the billing card will be sensed by the designated station. As the billing card passes each reading or sensing station, the brushes in that station will only sense the data (in the form of perforations or holes P) in the card field assigned thereto. The billing data represented by the perforations or holes P, when sensed, will be transmitted to the recording means (Fig. 1), there to be recorded on the sheet S in the proper locations.

The address information shown on sheet S, Fig. 2, is derived from an address card C (Fig. 4). This address card, like the billing card just described, is divided into areas or fields respectively corresponding to the reading stations. The station legends shown above the address card in Fig. 4 indicate the address data to be sensed by the respective stations. It will be noted that address data perforations or holes have not been shown on the address card C, Fig. 4, so as not to encumber or confuse the drawings, but of course it will be understood that the address card C will contain perforations such as those in the billing card (Fig. 3) to represent the items of address data.

It will be noted that Column 80 of the address card, which has been specifically designated in Fig. 4, contains certain control information (such as the perforation or hole P) for determining the types of sheet feeding movements which the sheet feeding means (Fig. 1) will be required to perform during the recording of the address. It is this control information which, when sensed by each reading station, will control the operation of the program selecting means (Fig. 1) and thereby bring about the selective operation of the space control devices. This will be explained in greater detail subsequently.

Fig. 5 is a plan view of the mechanical structure of the sheet feeding means diagrammatically shown in Fig. 1. The principal elements required to feed a sheet are visible in Fig. 5, while some of the incidental features of the various elements are found in Figs. 6 to 15, inclusive. The sheet feeding means is housed or retained in a framework consisting of sides 10 and 11, back 12 (Fig. 5), and top plate 13 (Fig. 12). Top plate 13 and the side plate 14 (Fig. 7) are portions of the recording machine proper to which the sheet feeding means may be attached.

With reference to Figs. 5 to 15, shaft 15 is employed to drive the sheet feeding means by being connected to the driving mechanism of the recording machine. The shaft 15 is rotatably supported in an extension 16 to extend into the framework through the opening 17 in the back 12. On the end of the shaft 15 is a bevel gear 18 which meshes with bevel gear 19 to drive the same. The bevel gear 19 is mounted on a change speed gearing shaft 20 to rotate the same in response to rotation of the shaft 15. Shaft 20 is rotatably supported in the framework by a block 21 suitably secured to said framework by screws 22. Fixed to the bevel gear 19 at the one end of shaft 20 is a large gear 23 forming a part of a change speed arrangement while smaller gear 24, also a part of the change speed arrangement, is fixed to the other end of the shaft.

Mounted in bearings 25 and 26 in the sides 10 and 11 respectively is an intermediate shaft 27. The rate of rotation of the shaft 27 can be selected in accordance with which one of the two clutches, generally designated by numerals 28 and 29, is selected for engagement. Both clutches are alike in structure and in operation except that one is intended to operate at higher speeds than the other. Clutch 28 is the high speed clutch since when it is actuated into engagement it receives its rotary speed from the high speed gear 23. The clutch 28 consists of an outer driving rim 30 which has hub 31 rotatably mounted on the shaft 27. Fixed on the hub 31 to rotate the same is a gear 32 which is constantly in engagement with high speed gear 23. A spacer 33 accurately spaces and retains the hub 31 in proper position. Within the rim 30 there is a driven hub 34 which guidingly mounts friction shoes 35 for radial sliding engagement with the inner surface of the rim 30. Fixed in any suitable manner to the intermediate shaft 27 as by a tapered pin is the driven hub 34 which mounts a portion of the axially slidable actuator 36. Links 37 interconnect the shoes 35 with the actuator 36 so that movement of the actuator will straighten the links to cause the shoes to engage with the rim 30. Operation of the actuator 36 is facilitated by yoke 38 (Figs. 6, 8 and 9) pivoted intermediate its ends at pin 39 on block 40 and connected at its forked end to collar 41 by set screws (not numbered). The yoke 38 is operated by the energization of solenoid 42 in opposition to the pull of return spring 43 which is connected to block 44. Adjustable pin 45 mounted in the block 44 limits the return pivotal movement of the yoke 38.

Spacer 46 retains the proper spacing between the low and high speed clutches 28 and 29 while providing for axial movement of the ring 41 and actuator 36 of clutch 28. The structure of the low speed clutch 29 is exactly the same as the high speed clutch 28 and accordingly the elements have been given similar numeric designations with the addition of the suffix letter *a*. There is a difference, however, between the two clutches 28 and 29, the difference residing in the size of the gear 47 which is mounted on the hub 31a of the low speed clutch 29. In this instance, because gear 47 is driven by small gear 24, the speed of the clutch 29, when engaged, will be slower than that of clutch 27. The operating yoke 38a of clutch 29 is also exactly the same as that of clutch 28, but in the drawings (see Figs. 10 and 11) the yoke operating solenoid of clutch 29 has been numbered 48 to distinguish it more clearly from the yoke operating solenoid 42 of the clutch 28.

It will be noted that the mounting of the solenoids 42 and 48 has been facilitated by the provision of two cross plates 49 and 50 (Figs. 6-11) which are extended between the side plates 10 and 11. In Fig. 9, the solenoid 42 and block 44, with the connected return spring 43 and the adjustable pin 45, are mounted on the plate 49 in such a manner as to permit the yoke 38 to extend through the cut-away portion 51 in the cross plate. In Fig. 11, the solenoid 48, block 44a along with the return spring 43a and adjustable pin 45a are mounted on cross plate 50 in such a manner as to permit the yoke 38a to extend toward spring 41a through a cut-away portion 52 in the plate.

The two clutches described above will enable the shaft 27 to be driven at different speeds. Thus if it is desired to drive the shaft 27 at slow speeds to effect spacing of the sheet a single line at a time or more than one line at a time the slow speed clutch 29 will be engaged by energizing the solenoid 48. On the other hand, if it is desired to eject the sheet the high speed clutch 28 will be engaged by energizing the corresponding solenoid 42. Therefore the operation of one or the other of the solenoids will execute the type of feed desired.

Mounted adjacent to the two clutches is a ratchet wheel 53 (Figs. 5, 8 and 10), a development of which is shown in Fig. 15. The ratchet wheel, like the driven hubs of the clutches, is also fixed to shaft 27 to rotate therewith. In this case, however, the ratchet 53 is not intended to rotate the shaft 27, but rather to be rotated thereby and to cooperate with a fixed pawl 54 engaging the ratchet teeth 55 to brake the rotation of the shaft at desired times. The teeth 55 on the ratchet 53 are engaged by the pawl 54 in the clockwise direction of rotation of the shaft 27 (see Fig. 6). Each tooth 55 has a land 56 upon which the pawl 54 may ride at times when it is lifted out of engagement with the teeth and is to be engaged with the next tooth. The purpose for this will become obvious as the description proceeds.

Pawl solenoid 57 is conveniently mounted on the block 58 (Fig. 6) which in turn is mounted on the back 12 of the framework. Also mounted on the block 58 is the pawl 54 which has a tail 59 laterally offset from the tooth engaging end 60. The pawl 54 is pivoted intermediate its ends on a pivot 61 retained in an extension 62 of the block 58. A return spring 63 mounted at one end to the block 58 by screw 64 engages the tail 59 of the pawl so as to constantly urge the engaging end 60 into engagement with ratchet teeth 55. Opposing the spring 63 is the pawl solenoid 57 which when energized will, through the link 65, remove the engaging end 60 from engagement with the ratchet teeth. When the solenoid is deenergized the spring 63 again moves the pawl toward engagement with the teeth. The ratchet and pawl arrangement described above operates only to brake the rotation of the shaft 27 at desired times to cause the sheet to be fed the desired amount.

Although the operation of the ratchet and pawl acting as a brake will be more fully explained later it may help to understand the operation of the feed means if the functions of the clutches and the ratchet and pawl brake arrangement are made clear. The clutches 28 and 29 permit the shaft 27 to transmit the selected type of sheet feed (e. g. high or low speeds) whereas, since each ratchet tooth 55 represents a line of recording on the sheet S the brake arrangement determines the length or amount of time during which the selected feed will operate. Thus, for both the clutches and brakes to cooperate harmoniously the pawl 54 of the brake must be disengaged from the ratchet teeth 55 before either of the clutches are engaged. On the other hand, to prevent injury to the brake, the engaged clutch driving the shaft 27 must be disengaged before the pawl 54 can engage the teeth 55. Accordingly it becomes obvious that the shaft, rotating by virtue of the inertia imparted to it by one of the clutches, is stopped by the brake arrangement.

To insure that the intermediate shaft 27 will have rotation in but one direction there is provided a one-way ball type brake (Figs. 5, 6 and 12) having a disc 66 fixed to hub 67 of the driven sheet feeding gear 68. Gear 68 is the member which ultimately transmits the drive to the sprocket wheels (not shown) which drive the sheet shown in Fig. 2. Accordingly, the gear 68 is attached to rotate with the shaft 27. The balls 69 are contained in a housing 70 which in turn is bolted to the plate 10 of the framework. Each ball rides on opposite sides of the disc 66 and on a cooperating tapered wedging surface 71. Springs 72 (Fig. 6) urge the balls toward the narrow portion of the tapered surface in the direction of stops 73.

The operation of the brake permits shaft 27 to be driven in one direction by the change speed gearing and clutches, but prevents reverse rotation when such drive ceases. When the drive ceases, any tendency on the part of the disc 66 to rotate in the reverse direction will aid the springs 72 in wedging the balls 69 between the surfaces 71 and the sides of the disc. This in turn will prevent reverse rotation of the gear 68 and also reverse feeding of the sheet 3.

Looking at Fig. 5 it will be seen that shaft 27 extends beyond the framework plate 10 to facilitate the mounting of timing devices or a circuit breaker arrangement generally designated CB. The circuit breaker arrangement CB as shown in Figs. 5, 7 and 16 consists of four cam members 1, 3, 4 and 5 all of which are mounted on an extended hub 73 of cam member 1 and fastened together as a unit by the pin 74. The hub 73 is accurately spaced from plate 10 by spacer 75 and is pinned to shaft 27 to rotate therewith. As noted immediately above, only four cam members 1, 3, 4 and 5 have been numbered while, in fact, there are five cams. The fifth cam is actually a part of the cam member 1 (shown in detail in Fig. 16) and will be referred to hereinafter as cam 2.

For each cam there is a circuit breaker follower numbered respectively 81, 82, 83, 84 and 85. The followers 81 to 85 inclusive are exactly alike in structure therefore an explanation of one will suffice for all. In the actual construction the followers have been arbitrarily divided into two groups (Fig. 7) for convenience only. Followers 81, 83 and 85 have been mounted on one insulated block 86. Followers 82 and 84 happen to be mounted on the other insulated block also numbered 86. Both of the blocks 86 are, in turn, attached to the framework. A bracket 87, screwed to the block 86, holds a pivot pin 88 upon which the follower arms 89 are pivoted. Five such follower arms 89 are provided, one for cooperation with each one of the five cams and cam followers 81–85 inclusive. Also attached to the blocks 86 are connectors 91, 92, 93, 94 and 95 (Figs. 7, 13 and 14) each of which have at their one ends contacts 96 (Fig. 7) which cooperate with contacts 97 on the follower arm 89, and at their other ends extensions (not numbered, but shown in Figs. 13 and 14) to which connector wires may be attached. Each of the contact numerals 96 and 97 are provided with a suffix numeral 1, 2, 3, 4 or 5 which are separated therefrom by a hyphen. The suffix numeral corresponds to the cam intended to operate the contacts having the same suffix numeral. Follower springs 98 attached to the follower arms 89 and to the brackets 87 constantly retain the followers in cam engagement.

In the specific embodiment of the invention herein disclosed, each of the cams 1–4 is assigned a particular function. These functional designations are illustrative only and may be varied to suit the circumstances under which the invention is employed. Briefly, the cams 1–4, under various conditions, operate to determine the respective times at which the pawl 54 engages the ratchet teeth 55 to brake the shaft 27. In describing the functions of these cams, reference will be made to Fig. 15 which shows the respective portions of the cycle during which the various cams are effective upon the pawl 54. The serially numbered teeth of the ratchet 53, Fig. 15, are indicative of relative angular positions in this cycle. The low or dwell portions of the cams, which are represented by solid lines in Fig. 15, will in some cases cause the pawl 54 to reengage the ratchet 53 following a previous disengagement of these parts (as in line spacing operations), and in other cases they will cause the pawl 54 to be disengaged from the ratchet 53 (as during an eject operation). A more complete description of these operations will be given presently.

Cam 5 may be termed an "interlock" cam since it insures that the recording machine will not be able to record "on the fly" during eject. That is to say, that when the follower 85 drops into the low portion of the cam the recording machine will automatically be locked to prevent recording during the eject operation. As can be seen in Fig. 15, the period of interlock of cam 5 occurs immediately after the last ratchet tooth 55 and ends a short time before the beginning of the first ratchet tooth, this being the interval known as the eject period during which the sheet is fed at high speed.

Cam 4 may be termed a "partial eject" cam inasmuch as its function is to enable the sheet to be ejected only after the fourth tooth 55 of the ratchet has passed under its pawl 54 (see Fig. 15). The angular length of the low portion of the cam 4 starts at a point after the fourth ratchet tooth and extends to a point immediately after the last tooth 55 on the ratchet. At such time when the dwell passes under follower 84 the contacts 96–4 and 97–4 on the follower 84 will be engaged to start the eject or high speed feeding operation. The eject operation continues until after the last tooth on the ratchet passes the braking pawl 54. Cam 4, therefore, permits an eject operation after the fourth line of recording has been accomplished.

Cam 3 has its low portion beginning immediately after the engaging portion of the last tooth 55. The low portion on the cam 3 then extends the angular distance prior to the beginning of the engaging face of the first ratchet tooth or the start of a new cycle of recording. Cam 3, therefore, enables an eject or high speed feeding operation to occur immediately after the last tooth on the ratchet has passed the pawl 54, if none has been initiated before that time.

Insofar as cams 1 and 2 are concerned, reference will be made first to Fig. 16. In Fig. 16 it will be seen that the cam shown therein has been divided (by dot-dash lines) into two portions designated 1 and 2. This means that the cam actually performs the functions of two cams namely, cams 1 and 2. The dwell portions on the part of the cam designated 1 are indicated in Fig. 15. The dwell portions on the cam designated as 2 in Fig. 16 are also indicated in Fig. 15. The follower 81 in Fig. 16 will encounter the dwells and high portions on the cam 1 before it will encounter the dwells and high portions on the cam 2. In a similar manner the follower 82 will encounter the dwells and high portions on the cam 2 before it will encounter the dwells and high portions on the cam 1. Cam 1 is so designed as to effect the engagement of the pawl 54 with each ratchet tooth 55 to provide for single line feed of the impression receiving sheet. Cam 2 on the other hand is so designed as to effect engagement of the pawl with the third ratchet tooth in the first instance, and with the fifth ratchet tooth in the second instance and with the eighth ratchet tooth in the third instance so that the cam 2 permits the sheet to be fed more than one line at a time.

Cams 1, 2, 3 and 4 therefore enable the braking of the intermediate shaft 27 at desired times and under circumstances controlled by the control information in Column 80 on the address cards. Each time the pawl 54 is removed from engagement with the leading edge or face of one of the ratchet teeth 55 by reason of energization of its solenoid 57, subsequent de-energization of the solenoid will occur (see Fig. 15) immediately prior to the tooth to be engaged. Because of this, the pawl 54 will fall onto the land 56 and ride thereon until it drops into the dwell to engage the leading edge or face of the desired tooth. In cases of eject, when the pawl solenoid 57 is de-energized, the pawl 54 falls onto the smooth surface of the ratchet and rides thereon until it engages the first ratchet tooth.

The aforementioned cams also control, to a certain extent, the operations of the low speed and high speed clutches. That is to say, these cams will insure that the low speed clutch is disengaged before the brake pawl 54 is applied, and that the high speed clutch is engaged and disengaged at the appropriate times. All this will be explained more fully hereinafter.

The program selecting means shown in Fig. 1 comprises, in essence, a record card sensing and relay actuating unit having a plurality of reading stations numbered 1, 2 and 3 and a cycle controller, both of which are shown more specifically in Fig. 17. In practice these elements may be of a more complex construction due to the variety of additional functions which they must perform, none of which are relevant to the present disclosure. The space control devices, also diagrammatically shown in Fig. 1, are shown more specifically in Fig. 18. To indicate the manner in which the program selecting means and the space control devices are intended to cooperate, a few representative cycles A, B and C of the cycle controller will be considered. The operation of the program selecting means is such that it is controlled in accordance with the control information in Column 80 of the record card, as explained below.

Each of the reading stations 1, 2 and 3 has a series of sensing brushes B, of which only two are shown in Fig. 1. One of the brushes B at each station is aligned with Column 80 of the record cards C (Fig. 4), and these brushes control the program selecting means. The other brushes control the recording means (Fig. 1). Usually there are 80 brushes at each station, one for each card column. These brushes normally are isolated from the rest of the system by brush relays BR (Fig. 17) having normally open contacts as 100. At appropriate times the brush relays BR are energized to bring selected brushes into play in accordance with a given program. The manner in which this is accomplished is a well known technique, and since it is not relevant to the present invention, a detailed description thereof will not be given.

Fig. 17 shows the "Column 80" brushes B of the three reading stations. These brushes, as just mentioned, control a program selecting means which is represented in Fig. 17 by the thyratrons T1 and T2, the cycle controller and various relays controlled by the aforesaid thyratrons and cycle controller. The cycle controller is a well known device which is adapted to pulse the output terminals such as A, B and C in a predetermined sequence and at given intervals to initiate various machine cycles. The operations which are to take place in these individual cycles are, in the present instance, determined in part by the control information which is contained in Column 80 of each record card C.

Referring again to Fig. 17, the "Column 80" brush relay contacts 100 of the various reading stations are connected in parallel to the input terminals of Wheatstone bridge networks 101 and 102, which are in the grid circuits of the thyratrons T1 and T2, respectively. Operating in timed relation with the passing of the record card C through each of the reading stations is a digit emitter 103. The digit emitter 103 is connected to the Wheatstone bridges 101 and 102 to fire either the thyratron T1 or T2 in accordance with a coincidental sensing by brushes B of control information in Column 80 of the record card. Thus, if as the record card C (Fig. 4) is passing through station 1 the brush B senses a perforation P at the index point 2 on the record card, and at the same time the emitter arm 104 of the emitter 103 makes contact with segment 2, tube T2 will be fired. The same is also true in the firing of T1 except that the segment 3 on the emitter 103 and a perforation or hole P at index point 3 on the record card will control the firing of this tube. The firing of tube T1 energizes relay 105 to close its contacts 105a while the firing of T2 energizes both relays 106 and 107 (when the cam operated contact 108 is closed) to close their respective contacts 106a and 107a.

The cycle controller, which is a part of the program selecting means, automatically causes the machine to perform a series of cycles beginning with the feeding of each individual record card C into the machine. For purposes of illustration, three cycles A, B and C will be considered. As each cycle is performed, certain relays will function. In cycle A, relay 109 is energized to close its contacts 109a and 109b. In cycle B relay 110 will be energized to close its contacts 110a and 110b; while in cycle C relay 111 will be energized to close its contact 111a. In the operation of the program selecting means during cycle A, the energization of the cycle A relay 109 coincidentally with that of the relay 105 will complete a circuit through the connector which is designated on Figs. 17 and 18. On the other hand, the coincidental energization of the cycle A relay 109 and the relay 107 will complete a circuit through the connector designated 2X.

In the performance of cycle B the coincidental energization of the cycle B relay 110 and the relay 106 will energize an eject relay 112 to close contact 112a, thereby completing a circuit through the connector designated Eject. The operation of the cycle controller during cycle C is similar to that of cycle B. During cycle C relay 111 cooperates with relay 105 to complete the circuit through the connector designated Eject to the eject relay 112.

The present description is concerned primarily with the operation of the program selecting means in response to a record card C containing control information in a predetermined column (such as Column 80) thereof. The operation which occurs when a source record not containing control information of this type is fed through the machine will not be considered herein, except to note that in some instances the recording means (Fig. 1) may respond to source records of different types (such as the billing card, Fig. 3, and the address card, Fig. 4) at different reading stations for simultaneously recording upon the sheet (Fig. 2) information derived from both of these source records.

The circuits through the connector lines 1X, 2X and Eject, Fig. 17, are selectively completed by the coincident energization of the reading station relays and the cycle controller relays in various combinations, as described above, and the coincidental closing of contact 114 by the cam 115. Completion of any one of these circuits will fire the respective thyratron or gas tube T3, T4 or T5, Fig. 18. Grid bias resistors G1 and G2, in divider formation, are provided for each tube T3, T4 and T5, the arrangement being such that a ground pulse at the junction between the two resistors G1 and G2 of any pair will ground the grid of the respective tube and cause the tube to fire.

Thus, the completion of the circuit through the connector line 1X will fire the "single-space" thyratron T3, Fig. 18, which is included in the "1 Line" space control device (Fig. 1). Firing of the single-space tube T3 energizes a relay 116 which has two transfer contacts 116a and 116b, Fig. 18. The closure of contact 116a will energize the low speed clutch solenoid 48 to engage the low speed clutch, while the closure of the other contact 116b will energize the ratchet solenoid 57 to raise the pawl 54 from engagement with the ratchet wheel 53 a brief period before the clutch is engaged.

Completion of the circuit through the connector line 2X will fire a thyratron T4, Fig. 18, in the "More than 1 Line" space control device (Fig. 1) of the sheet feeding means to feed the sheet more than one line at a time. The firing of tube T4 energizes a relay 117 which has a pair of contacts 117a and 117b. Closing of contact 117a energizes the low speed clutch solenoid 48 to engage the low speed clutch, while closing of the contact 117b will energize the ratchet solenoid 57 to disengage the pawl 54 from the ratchet 53 before the engagement of the clutch.

Similarly, the completion of the circuit through the Eject connector line will fire the thyratron T5, Fig. 18, in the Eject space control device (Fig. 1) to permit the sheet feeding means to eject the sheet. Upon the firing of tube T5, relay 118 will be energized to close a pair of contacts 118a and 118b. Contact 118a, in closing, energizes the high speed clutch solenoid 42 to engage the high speed clutch while contact 118b, in closing, energizes solenoid 57 to disengage the pawl 54 from the ratchet 53 before the clutch is engaged. The disengagement of the pawl from the ratchet and the engagement of the high speed clutch permit the sheet feeding means to eject the sheet and to present a new sheet for recording.

Thus, the selective firing or operation of the thyratrons T3, T4 and T5 by the program selecting means, as mentioned, energizes one of the space control relay circuits in accordance with the amount of sheet feed required. It should be noted that the initial firing of the selected thyratron initiates the operation of the respective space control relay circuit, and the continued conduction of the selected thyratron after firing thereof serves to hold or maintain the respective relay circuit in an operative state. Hence, each of the gas tubes T3, T4 and T5 may be regarded as an element of a means for operating a particular relay circuit and also as an element of a holding device for maintaining this relay circuit in operation.

The intermediate shaft 27 of the sheet feeding means (Fig. 5) will continue to rotate so long as the selected relay circuit is operating. In other words, the sheet feeding operation will continue so long as the holding device for the operative space control relay circuit is effective. Included in the holding devices are the timing devices of the circuit breaker assembly CB (Figs. 5 and 7) previously described as mounted on the end of the intermediate shaft 27 to rotate therewith and each adapted to terminate the operation of its respective holding device after a selected time.

Looking at Fig. 18 it will be seen that there is coupled to the plate or anode of the single space tube T3 (through the condenser 119) the single space cam 1 (Fig. 16) of the circuit breaker assembly. Similarly, the cam 2 is coupled through a condenser 119a to the plate of the tube T4 which is employed for sheet spacing more than one line at a time. Thus it will be seen that there is a timing device or a circuit breaker cam controlling each of the space control tubes T3 and T4. When either one of the space control devices T3 or T4 is selectively operated in response to the program selecting means, the circuit breaker CB is set into operation. As the low or dwell portion of the cam 1 or 2 passes under its respective follower 89, the corresponding cam contact 96–1 and 97–1 or 96–2 and 97–2 will close (see Fig. 7) to close a circuit from ground (GND) through a condenser 119 or 119a, Fig. 18, to the plate of the respective tube T3 or T4. This closed circuit momentarily puts the plate of the tube T3 or T4 at ground potential, thereby extinguishing the tube and terminating the operation of the holding device for relay 116 or 117, as the case may be.

In contradistinction to cams 1 and 2, cam 4 completes the circuit from the cathode of Eject tube T5 to ground, enabling tube T5 to be fired if the Eject circuit is closed.

However, when cam 4 opens its contacts, the operation of the holding device of the tube T5, Fig. 18, is terminated and the tube is extinguished. Extinguishing tube T5 de-energizes relay 118 to de-energize latch solenoid 57. This permits the pawl to drop on the smooth portion of the ratchet wheel 53, where it rides until the first ratchet tooth is engaged thereby. The high speed clutch solenoid 42 is prevented from de-energizing prematurely through the action of cam 3 (by way of connector 120) which makes before the break of cam 4 and therefore continues to hold the solenoid circuit (see Fig. 15). Cam 3 opens to de-energize the clutch solenoid 42 before the pawl 54 has reached the first ratchet tooth. Engagement of the pawl 54 with the first tooth of the ratchet 53 stops the operation of the sheet feeding mechanism, thereby positioning a new sheet for recording.

The operation of the disclosed apparatus will be described with reference to a specific example, but of course this should not be regarded as limiting the utility of the invention. At the time the recording machine is turned on for operation the sheet S, shown in Fig. 2, will be positioned to receive its first line of recording. In the specific example assumed herein, the first line of recording will be the first line of billing data. When the machine is operated to initiate the feeding of the individual record cards through the reading stations, a sequence of cycles is simultaneously initiated by the cycle controller. Although a record card need not necessarily be fed during each cycle, the length of a cycle may be defined as beginning with the reading of a record card and as ending with the recording of the data contained thereon, or up to the time when a new card is about to be read.

Since the sheet S is in recording position at the start of the machine operation, the high and low speed clutches of the sheet feeding means will be disengaged. The first tooth of the ratchet 53 will, however, be engaged by the braking pawl 54. Because the sheet S is designed to receive billing data in the first line, the first record card fed through the reading stations will be a billing card, Fig. 3. As the billing card passes through reading station No. 1 (Fig. 1) the billing data read therefrom will be transmitted to the recording means for recording on the first billing line. The billing card continues in its travel to reading station No. 2, where the next item of billing data is sensed. In referring to the sheet S, Fig. 2, it will be seen that the billing data sensed at reading station No. 2 is double-spaced from the first line of billing data. This double spacing may be automatically accomplished by automatic controls which are incorporated into the machine because of the particular type of recording format required, so that the sheet feeding means is operated automatically to double-space the first line of billing data from the second line of billing data. In this case the second line of billing data is on the same line as the first line of the recorded address data (name and address of the insured).

When the cycle controller is ready to start the second cycle of the machine (herein identified as cycle A), an address card (Fig. 4) is moved into position to be read by reading station No. 1. In this relationship, when the new cycle begins, both the address and billing cards will have been fed into reading positions. The reading of the two cards will then be performed simultaneously during cycle A. Station No. 2 will transmit the proper billing data to the recording means, which then records the same. At the same time station No. 1 will sense the address data on the address card and transmit the same to the recording means to be recorded simultaneously with the billing data. During the time that station No. 1 senses the address data on the address card it also senses the control information in Column 80 and transmits this information to the program selecting means to select one of the space control devices for operation. The control information in the address card as sensed at station No. 1 then determines the subsequent feeding of the sheet feeding means.

It is apparent that many types of feeds are possible, and it would be cumbersome to thoroughly explain all of them. For simplicity only two cases will be considered as exemplary of the various operations which the invention is capable of performing. The first case is one in which it is necessary to record a three-line address on sheet S (as seen in Fig. 2), with the various lines of the address being single spaced from each other. In the second case, wherein there is only a two-line address such as the name in the first line and city and State in the second line (street address being omitted), the second line of the address is double-spaced from the first line of the address.

In the first case, wherein the name, street address and city and State are single spaced to make up the three-line address, a hole P will be provided at index point 3 in Column 80 on the address card (Fig. 4). The sensing at station No. 1 of the presence of a hole at the third index point on the address card effects a single space during the machine cycle A in the following manner. A coincidence circuit for firing the thyratron T1, Fig. 17, will be established momentarily by the sensing of a "3" hole in Column 80 simultaneously with the contacting of segment 3 by the emitter arm 104. Tube T1 fires and energizes the relay 105. A circuit then will be completed to fire the single-space tube T3 (Fig. 18) through the contact 105a of relay 105 and contact 109a of the cycle A relay 109, Fig. 17. This circuit will be completed immediately following the print operation in cycle A. The firing of tube T3 will energize relay 116, Fig. 18, which has the two transfer contacts 116a and 116b. The closing of contact 116a will energize the low speed clutch solenoid 48 and the closing of the other contact 116b will energize the latch solenoid 57. Energization of the latch solenoid 57 causes the pawl 54 to be raised out of the path of teeth 55 on the ratchet wheel 53 slightly prior to the engaging of the clutch, thus allowing the ratchet wheel to rotate when the clutch is engaged. Operation of the sheet feeding means by the clutch also initiates operation of the circuit breaker assembly CB, coupled to the sheet feeding means. Cam 1, in the plate circuit of tube T3, is part of the circuit breaker assembly which rotates only when the ratchet wheel 53 rotates. Cam 1 closes a circuit from ground (GND) through condenser 119 to the plate of tube T3 immediately after the pawl 54 has passed a single ratchet tooth 55. This circuit momentarily puts the plate at ground potential, thereby extinguishing the tube T3. Since there is no longer a firing potential on the grid to reignite the tube T3, the tube will remain extinguished, and relay 116 therefore is de-energized. The latch solenoid 57 and clutch solenoid 48 will, as a consequence, be de-energized, and the pawl 54 will enter the low dwell of the next succeeding ratchet tooth 55. The inertia of the sheet feeding means brings the pawl 54 against the face of the next succeeding ratchet tooth, and the reverse lock mechanism or one-way brake 66—73 will prevent rebounding and insure that paper R feeds but a single space.

With a hole at index point 3 in Column 80 of the address card, the relay 105, Fig. 17, will operate as the card is sensed at each of the three reading stations. At the second reading station, during cycle B of the cycle controller, a circuit will be completed in the same manner as set forth before but this time through the contact 110b of the cycle B relay 110. The initial firing and continued operation of the single-space tube T3 takes place the same as before and as described above. Thus, at the first two reading stations the control information (namely, the hole at index point 3 in Column 80) will space the paper R a single line after each printing operation.

At station 3, during cycle C, relay 105 operates in conjunction with the cycle C relay 111 and the eject relay 112 to initiate an ejection of the sheet S from the recording machine through contacts 105b, 111a and 112a. The simultaneous operation of the relays 105, 111 and 112 completes the circuit to the grid of tube T5 in the spacing circuit. The firing of tube T5 energizes relay 118, which has two transfer contacts 118a and 118b. Contact 118b energizes the latch solenoid 57 to pull the pawl 54 from the path of the ratchet teeth 55, while contact 118a energizes the high speed clutch solenoid 42 to engage the high speed clutch. This engagement of the high speed clutch rotates the sheet feeding means and also the cirucit breaker assembly CB. When the ratchet wheel 53 has rotated to a point where the last ratchet tooth passes beneath pawl 54, cam 4, which completed the circuit from the cathode of tube T5 to ground, opens. This causes tube T5 to extinguish and in turn de-energizes relay 118. The latch solenoid 57 de-energizes, causing the pawl 54 to drop on the non-toothed or smooth portion of the ratchet wheel 53. The clutch solenoid 42 is prevented from dropping out of action through the operation of cam 3, which makes before the break of cam 4 to continue the solenoid circuit. Cam 3 then opens before the pawl engages the first ratchet tooth. The opening of cam 3 de-energizes the clutch solenoid 42 and allows the sheet feeding means to rotate by its own inertia. This rotation is stopped by the pawl 54 hitting the face of the first tooth 55 (1), see Fig. 15, and is prevented from rebounding by the reverse lock mechanism 66—73.

Recycling of the cycle controller is accomplished automatically in a well known manner following the eject operation. This places the machine in condition to perform a new series of recording and spacing operations.

The operation of the invention in the second case, in which there are only two lines of address, is very much similar to that in the first case. Here, however, different relays and circuits are utilized. To effect a double space in a two-line address, the control information is in the form of a hole P located at index point 2 in Column 80 of an address card similar to that shown in Fig. 4. The sensing of the presence of a hole P at the second index point on the address card at reading station No. 1 establishes a coincidence circuit for firing tube T2, Fig. 17, when the arm 104 makes contact with the segment 2 of the emitter 103. The firing of tube T2 energizes both relays 106 and 107. However, during the performance of cycle A under the control of the cycle controller, only the relay 107 will be effective to complete a circuit through the contacts 107a and the contacts 109b of the cycle A relay 109, causing the double-space tube T4, Fig. 18, to be fired immediately after the print operation in cycle A. Firing of tube T4 in turn energizes relay 117, which has contacts 117a and 117b. The same operation performed by relay 116 and its two contacts 116a and 116b are also performed by relay 117 and its two contacts. In this case the only difference is that the operation of tube T4 will be terminated by cam 2 of the circuit breaker assembly CB after two ratchet teeth 55 have rotated past the pawl 54. Thus, the paper R and its sheet S will move two spaces from the first line of the recorded address during cycle A. The sheet S now will be ready to receive its second line of address.

In cycle B the presence of the hole at the second index point in Column 80 will again energize relays 107 and 106 in the same manner as in cycle A. A circuit now will be established through the contact 106a of relay 106 and the contact 110a of the cycle B relay 110 to energize the eject relay 112. The eject operation will now occur in the same manner as for a three-line address card except that it will be one cycle earlier. The machine once again is set up for a new recording and spacing operation as part of the automatic recycling function of the cycle controller.

To recapitulate, if there is a three-line address to be recorded, with single spacing between lines, a hole P will be placed at index point 3 on the address card containing the address information (Fig. 4). Similarly, for a two-line address wherein the last line is double-spaced from the first, the control information will be in the form of a perforation P at index point 2.

In the event that there is a four-line address to be recorded each of the lines will be single spaced from the other. The address card will bear three lines of the address recording information and as a consequence will have a control hole P at the third index point. However, since the address card shown in Fig. 4 lacks sufficient room for a fourth line of address recording information a second similar address card is provided and it will have the fourth line of address data and a control hole P at index point 1. In such case when the first address card arrives at reading station 3, the second address card will arrive at station 1, since the feeding of cards through the reading stations occurs once every other cycle of the cycle controller. A suitable control circuit (not shown in the drawings but obvious from the present teachings) is provided so that a control hole at the first index point supersedes the normal effect of a control hole at the third index point. Hence, while ordinarily the eject operation would occur when a hole P appearing at the third index point is sensed at station 3, the sensing of a control hole P at the first index point on the second address card (at reading station No. 1) will hold the eject operation in abeyance until the fourth line of address has been recorded from the information on the second address card. It should be realized, of course, that other combinations of spacing and recording functions may be accomplished in response to the control information contained in the record cards.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

The invention is claimed as follows:

1. In a machine adapted to record lines of data successively upon a sheet under the control of a source record separate from said sheet, said source record containing representations of the data to be recorded in a plurality of lines and also containing additional control information having numerical significance for determining the extent to which the sheet is to be advanced after each line of data is recorded thereon, a plurality of reading stations through which the source record is adapted to travel successively, each of said reading stations including means for sensing in the source record the representations of data to be recorded in a particular line on the sheet and means for sensing the associated control information in the source record, sheet feeding means, a plurality of control devices for said sheet feeding means operable selectively to effect movement of the sheet in different selected amounts, selecting instrumentalities for said control devices governed by said plurality of reading stations, and means enabling said selecting instrumentalities to operate variantly in response to the control information sensed in the source record at any of said reading stations and also in accordance with the position attained by the source record during its travel through said reading stations to select the appropriate one of said control devices for operation as each line of data is recorded upon the sheet.

2. In a machine adapted to record lines of data successively upon a sheet under the control of a source record separate from said sheet, said source record containing representations of the data to be recorded in a plurality of lines and also containing additional control information having numerical significance for determining the number of line spaces by which the sheet is to be advanced after each line of data is recorded thereon, a plurality of reading stations through which the source record is adapted to travel successively, each of said reading stations including means for sensing in the source record the representations of data to be recorded in a particular line on the sheet and means for sensing the associated control information in the source record, sheet feeding means, a plurality of control devices for said sheet feeding means operable selectively to effect different spacing movements of the sheet, selecting instrumentalities for said control devices governed by said plurality of reading stations, and means enabling said selecting instrumentalities to operate variantly in response to the control information sensed in the source record at any of said reading stations to select the appropriate one of said control devices for advancing the sheet a desired number of line spaces.

3. In a machine adapted to record lines of data successively upon a sheet under the control of a source record separate from said sheet, said source record containing representations of the data to be recorded in a plurality of lines and also containing additional control information having numerical significance according to whether the sheet is to be advanced one line, more than one line or ejected after each line of data is recorded thereon, a plurality of reading stations through which the source record is adapted to travel successively, each of said reading stations including means for sensing in the source record the representations of data to be recorded in a particular line on the sheet and means for sensing the associated control information in the source record, sheet feeding means, a plurality of control devices for said sheet feeding means operable selectively for causing the sheet to be fed one line, more than one line or ejected, selecting instrumentalities for said control devices governed by said plurality of reading stations, and means enabling said selecting instrumentalities to operate variantly in response to the control information sensed in the source record at any of said reading stations and also in accordance with the position attained by the source record during its travel through said reading stations to select the appropriate one of said control devices for operation.

4. In a machine adapted to record lines of data successively upon a sheet under the control of individual source records separate from said sheet, each of said source records containing representations of the data to be recorded in a plurality of lines and also containing an additional control indicium having numerical significance for determining the extent to which the sheet is to be advanced after each line of data is recorded thereon, a plurality of reading stations through which each of the source records is adapted to travel successively, each of said reading stations including means for sensing in a source record the representations of data to be recorded in a particular line on the sheet and means for sensing the associated control indicium in the source record, sheet feeding means, a plurality of control devices for said sheet feeding means operable selectively to effect movement of the sheet in different selected amounts, selecting instrumentalities for said control devices governed by said plurality of reading stations, and means enabling said selecting instrumentalities to operate variantly in response to different control indicia sensed at any of said reading stations and the same control indicium sensed at different reading stations to select said control devices for operation.

5. In a machine adapted to record lines of data successively upon a sheet under the control of individual source records separate from said sheet, each of said source records containing representations of the data to be recorded in a plurality of lines and also containing an additional control indicium having numerical significance for determining whether the sheet is to be advanced one line, more than one line or ejected after each line of data is recorded thereon, a plurality of reading stations through which each of the source records is adapted to travel successively, each of said reading stations including means for sensing in a source record the representations of data to be recorded in a particular line on the sheet and means for sensing the associated control indicium in the source record, sheet feeding means, a plurality of control devices for said sheet feeding means operable selectively for causing the sheet to be fed one line, more than one line or ejected, selecting instrumentalities for said control devices governed by said plurality of reading stations, and means enabling said selecting instrumentalities to operate variantly in response to different control indicia sensed at any of said reading stations and the same control indicium sensed at different reading stations to select said control devices for operation.

References Cited in the file of this patent

UNITED STATES PATENTS

| | | |
|---|---|---|
| 1,954,041 | Daly | Apr. 10, 1934 |
| 2,046,001 | Scharr | June 30, 1936 |
| 2,056,393 | Didzuns | Oct. 6, 1936 |
| 2,066,029 | Carroll | Dec. 29, 1936 |
| 2,310,418 | Ghertzmann | Feb. 9, 1943 |
| 2,348,059 | Daly | May 2, 1944 |
| 2,442,970 | Carroll | June 8, 1948 |
| 2,476,449 | McDonnell | July 19, 1949 |
| 2,531,885 | Mills | Nov. 28, 1950 |